A. SUNDH.
MEANS FOR EFFECTING THE CONTROL OF AN ALTERNATING CURRENT ELECTRIC MOTOR.
APPLICATION FILED JUNE 27, 1907.
950,467.
Patented Feb. 22, 1910.
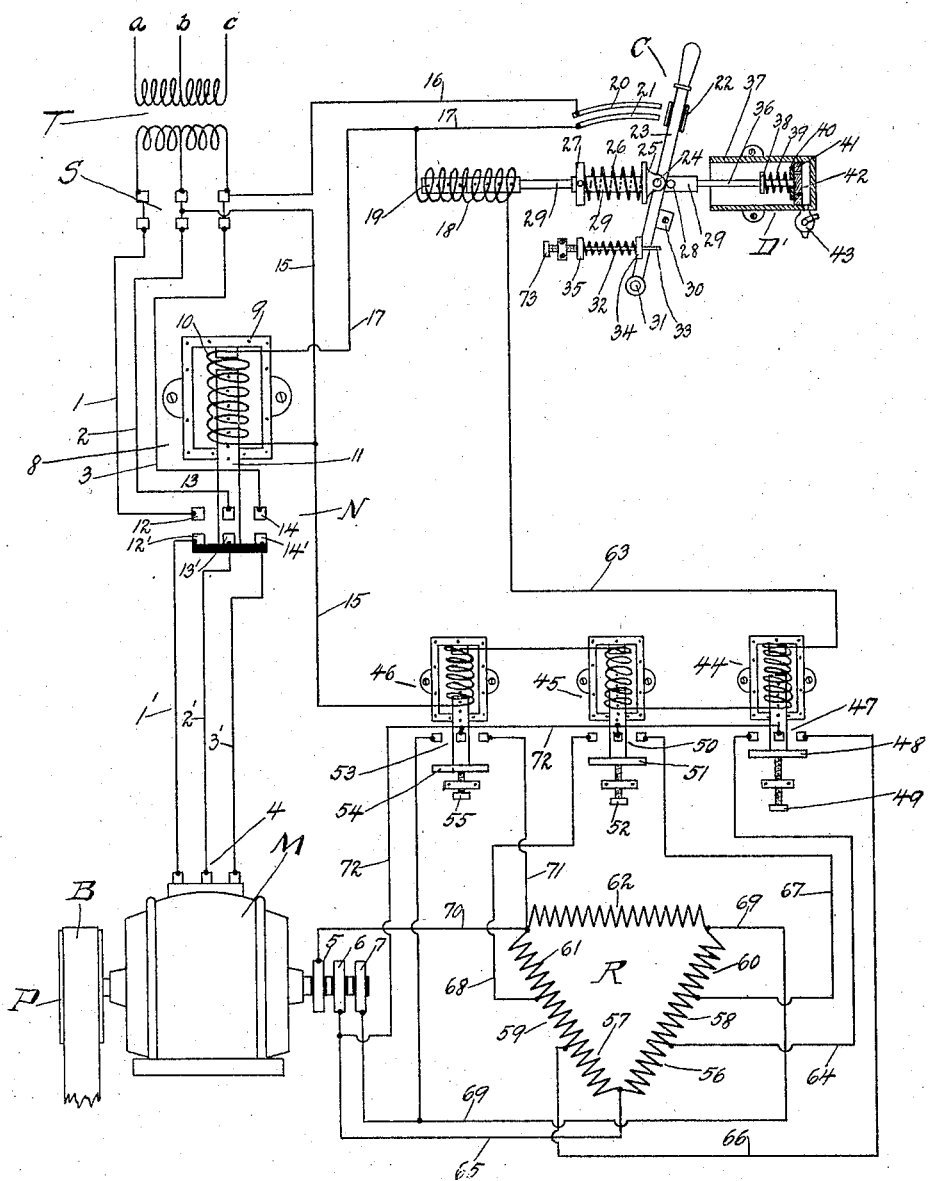

UNITED STATES PATENT OFFICE.

AUGUST SUNDH, OF YONKERS, NEW YORK, ASSIGNOR TO OTIS ELEVATOR COMPANY OF JERSEY CITY, NEW JERSEY, A CORPORATION OF NEW JERSEY.

MEANS FOR EFFECTING THE CONTROL OF AN ALTERNATING-CURRENT ELECTRIC MOTOR.

950,467. Specification of Letters Patent. Patented Feb. 22, 1910.

Application filed June 27, 1907. Serial No. 380,992.

*To all whom it may concern:*

Be it known that I, AUGUST SUNDH, a citizen of the United States, residing in Yonkers, in the county of Westchester and State of New York, have invented a new and useful Improvement in Means for Effecting the Control of Alternating-Current Electric Motors, of which the following is a specification.

My invention relates to the control of electric motors, and one of its objects is the provision of simple and efficient means for effecting the control of an alternating current electric motor.

Other objects will appear more fully hereinafter and the novel combinations of elements set forth in the claims hereunto annexed.

The accompanying drawing illustrates a motor-controlling system embodying my invention in which—

T designates a transformer whose primary winding is connected to a source of three phase alternating current or other variable current by means of the conductors $a$, $b$ and $c$. The secondary winding of this transformer is connected through the main line switch S by conductors 1, 2 and 3 to three stationary contacts 12, 13, and 14. An electrically operated switch 8 comprises a magnet frame 9, winding 10 and laminated core 11 at one end of which is connected an insulating piece carrying contacts 12′, 13′ and 14′. These contacts are directly beneath and are arranged to engage the stationary contacts 12, 13 and 14, respectively, when in their raised position. The contacts 12′, 13′ and 14′ are connected by conductors 1′, 2′ and 3′ respectively to the stator terminals 4 of a three-phase alternating current motor M. One end of the motor shaft carries a driving pulley P which is adapted to supply power to any desired device to be operated or driven by means of a belt B. The other end of the motor shaft is provided with collector rings 5, 6, and 7 which are connected in a well-known way to the motor winding of the motor. A delta-connected starting resistance R is connected through the conductors 70, 65 and 69 to the collector rings 5, 6 and 7, respectively, and is normally included in the rotor circuit of the motor.

44, 45 and 46 are electrically operated relays and they control the cutting out of the resistance R. These relays are similar in construction and each comprises a magnet frame and solenoid and an electric switch. At the lower end of the solenoid cores are connected the contact plates 48, 51 and 54 which when lifted bridge or electrically connect the stationary contacts 47, 50 and 53 respectively directly above the contact plates. Set screws 49, 52 and 55 may be used to adjust the position of each core with respect to its magnet winding.

C designates a controlling switch and comprises a lever 23 to which is connected an insulated contact 22 adapted to engage two stationary contact strips 20 and 21. The switch lever 23 is pivoted at 31 and carries a bracket 25 which is pivoted at 24, also a rigid piece 34 provided with a hole through which a rod 33 passes freely. This rod carries a compression spring 32 and has a head 35 against which the spring presses. 73 is a set screw by means of which the tension of the spring 32 may be regulated and 30 is a fixed stop for the lever 23.

A bar 29 carries a compression spring 26 which bears against the bracket 25 and a collar 27 fixed to the bar 29. A pin 28 is fastened to the bar 29 and is held against the switch lever 23 by the spring 26 when the parts are in the position shown. One end of the bar is connected to a laminated core 19 centrally located in a solenoid 18, while the other end is connected by a rod 36 to the piston 41 of the dashpot device D. The latter comprises a cylinder 37 closed at one end and containing the piston 41 having ports 42 which are normally closed by a disk 40 which is pressed against the piston by a spring 39 bearing against a collar 38 upon the rod 36. An air cock 43 is provided at the closed end of the cylinder 37 for the purpose of regulating the movement of the dashpot piston and its connected parts.

In order to show the operation of the above-described apparatus, let it be assumed that the switch lever 23 is moved to the left until the sliding contact 22 carried thereby engages or electrically connects the contact strips 20 and 21. This operation closes a circuit through the winding of the electrically-operated switch 8, this circuit being from one terminal of the transformer secondary by the conductor 16, contacts 20, 22, and 21, conductor 17, magnet winding 10 and by conductor 15 of the middle terminal of the transformer. The magnet 8 is thereupon energized by single-phase current to lift its core 11 and connected contacts 12', 13' and 14' until the latter engage the contacts 12, 13 and 14, respectively, thereby closing a circuit from the main line switch S to the stator winding of the motor through the wires 1, 2, 3 and 1', 2', 3', respectively. The stator windings now receive current and currents are induced in the rotor winding, being limited by the starting resistance R. When the switch lever 23 is moved to the left, a short distance, the spring 26 is slightly compressed exerting a pressure upon the collar 27 tending to move the bar 29 and its connected parts to the left, the bracket 25 moving freely on the said bar. The latter, however, is retarded in its movement in a left hand direction by the dashpot D, for, as soon as the piston 41 moves outwardly a partial vacuum is formed behind the piston and the inflow of air to refill this vacuum is restricted by the air cock 43. At the same time that the sliding contacts 22 engage the contact strips 20 and 21, a circuit is closed through the solenoid 18 by the wire 16, contacts 20, 22 and 21, wire 17, solenoid 18, wire 63, and the windings of the relays 44, 45 and 46, and the wire 15 to the main line switch S. The core 19 at this time is substantially surrounded by the winding of the solenoid 18 and the impedance in this circuit is so great that only a very small current can flow, consequently the relays 44, 45 and 46 are not sufficiently energized to lift their respective laminated cores. At this time the motor M is running at slow speed with all of the starting resistance R in circuit with the rotor winding. If now the switch lever 23 is moved over to the left to its extreme position, the spring 26 is again compressed, moving the bar 29 slowly to its extreme position, this movement being checked by the dashpot. As the core 19 slowly moves out of the solenoid 18 the impedance of the circuit which includes this solenoid is gradually lessened and more current will flow through the solenoid 18 and the relay magnets 44, 45 and 46. This circuit gradually increases as the core 19 moves out of the solenoid 18 until finally the relay 44 is operated. This short-circuits the sections 56 and 57 of the starting resistance R through the wires 66, 72 and 64, permitting a greater induced current to flow in the rotor winding, followed by an increase in the speed of the motor M. As the core 19 moves still farther to the left, the impedance of the relay magnet circuit becomes still less followed by an increase of current flow until finally the relay 45 operates to effect the lifting of the contact plate 51, thereby bridging the stationary contacts 50, and so short-circuiting the additional sections of starting resistance 58 and 59 through the wires 67, 72 and 68. This is followed by a still further increase of motor speed until finally the third relay 46 operates and the entire starting resistance R is short-circuited, since the three contacts 53 of the relay 46 are connected one to each collector ring 5, 6 and 7 of the motor and the latter now runs at full normal speed with the rotor windings short-circuited upon themselves.

The relays are so arranged that they will always operate in some predetermined order or sequence. This object may be attained in a number of different ways. I prefer, however, to effect the proper operation of the relays by varying the distance which the different relay cores extend into their respective windings, for, since the relay windings are all connected in series with each other, the current in each winding is the same, and the relay whose core is in the strongest field will operate first.

In order to stop the motor, the switch lever 23 is brought back to its initial position thus breaking the circuit to the winding of switch 8 and also the circuit to the relays 44, 45 and 46, causing all the parts to automatically return to their first or normal position, and the motor to come to rest, its circuit being interrupted at the contacts 12, 13, and 14. As the lever 23 is thus brought back to its initial position the bar 29 is positively moved with it, due to the lever engaging the pin 28. The dashpot D offers little or no resistance to the movement of the bar 29 in a right-hand direction since any compression of air in the dashpot cylinder moves the disk 40 against the action of the spring 39 thereby uncovering the ports 42 and allowing the confined air to readily pass out through these ports. As the bar 29 is carried back to its first position the core 19 is once more located substantially in the center of the solenoid 18 as shown, and the entire apparatus is ready for any subsequent operation, with all the starting resistance again in circuit with the rotor winding of the motor. Should the switch lever 23 be slowly brought back to starting position the impedance of the solenoid 18 and that of the circuit to the relay windings is gradually increased followed by a gradual reduction in current flow until finally the relays become too weak to further maintain their cores in closed position, and the latter return to their original positions. The order in which the relays will become deën- ergized and drop their cores will always occur in a certain predetermined sequence and the re-insertion of the starting resistance into the rotor circuit will be governed accordingly. Should the switch lever 23 be in any position other than its initial or starting position, and the operator remove his hand therefrom, the spring 32 would at once move the lever back to starting position, thus automatically stopping the motor and restoring the various parts to normal starting position.

The above described system of alternating current motor-control may be advantageously adapted to various uses, and, while I illustrate a three-phase alternating current motor adapted to transmit power by a belt to any desired apparatus, the controlling system is particularly adapted to an alternating current electric elevator apparatus. When used for such purpose the manually operated switch C would preferably be placed in the elevator car and also means would be provided to reverse the direction of rotation of the motor in order to effect the lifting and lowering of the elevator car. Means for reversing the direction of rotation of any electric motor are common and well known in the art. A valuable feature of the switch C is, that, while the operator may start and accelerate the motor as slowly as he desires, it is impossible for him to suddenly throw the full current strength onto the motor, since the operating switch lever is indirectly connected to the core of the impedance varying coil 18 and this coil determines the current flow to the accelerating relays and thus controls the rate at which the motor-starting resistance is short-circuited and therefore the rate of acceleration of the motor. Should the operator throw the operating switch lever rapidly to its extreme position, the core of the impedance or choking coil 18 would have a slower movement limited by the dashpot D and since the latter may be adjusted so as to allow any desired rate of movement of its piston and connected core 19 by regulating the air cock 43, this rate when once determined cannot be exceeded no matter how rapidly the operating switch is manipulated.

While I have shown and described a motor-controlling system fed by conductors leading from a three-phase supply of alternating current, with slight modifications it is equally adapted to an alternating current supply of any phase or an intermittent or pulsating direct current.

A further advantage accomplished by my invention lies in the use of inductive apparatus for varying the current strength in the resistance-controlling relays, for when the current flow in a circuit is varied by means of regulating the impedance in said circuit, there is substantially no waste of current which is always present where the usual method of cutting in or cutting out of circuit a series of resistances is employed.

My invention does away with the necessity of using a number of sliding or other movable contact devices for varying the current flow in the accelerating relay circuit, and, while I have shown but three accelerating relays, I sometimes use more or less, depending on various conditions of load and smoothness of acceleration, as in passenger elevator service.

I have described a simple and practical form of my invention, and it is obvious that various changes in arrangements of the circuits, and in the mechanical construction and arrangements of parts might be made within the scope of the invention, and without departing from the spirit thereof.

What I claim and desire to secure by Letters Patent of the United States is:—

1. In a motor-control system, the combination with a motor, and a source of current supply, of a normally open controlling circuit, a switch member movable into position to close the circuit, means associated with said switch member for varying the inductance of the circuit, and means responsive to such variations for controlling the speed of the motor.

2. In a motor-control system, the combination with a motor and a source of current supply, of a controlling circuit, a normally open switch in the circuit, an impedance coil in the circuit, means associated with the movable member of the switch for varying the impedance of said coil, and means responsive to such variations for controlling the speed of the motor.

3. In a motor-control system, the combination with a motor and a source of current supply, of a controlling circuit, spaced contacts in the circuit, an impedance coil in the circuit, a movable member, means carried thereby for closing the circuit through the contacts after the initial movement of said member, means associated with said member for varying the impedance of the circuit with a further movement of said member, and means responsive to such variation for controlling the speed of the motor.

4. In a motor-control system, the combination with a motor and a source of current supply, of a normally open controlling circuit, an impedance coil in the circuit, a manually operable device, means associated with said device for closing the circuit after its initial movement, a magnetic core associated with said device and movable upon a further movement of said device to vary the impedance of the circuit, and means responsive to such variation for controlling the speed of the motor.

5. In a motor-control system, the combination with a motor and a source of current supply, of a controlling circuit, a manually-operable device, means associated therewith for varying the impedance of the circuit, means for retarding the movement of the impedance-varying means, and means responsive to such variation for controlling the speed of the motor.

6. In a motor-control system, the combination with a motor and a source of current supply, of a controlling circuit, an impedance coil in the circuit, a magnetic core, a manually-operable device associated with the core to move the core relatively to the coil, means for retarding the movement of the core when the manual device is moved rapidly, and means responsive to the variation of inductance in the circuit as the core is moved for controlling the speed of the motor.

7. In a motor-control system, the combination with a motor and a source of current supply, of a controlling circuit, an impedance coil in the circuit, a magnetic core in the coil, a controlling lever, a yielding connection between the lever and core, a retarding device connected to the core, and means responsive to variations in the inductance of the circuit for controlling the speed of the motor.

8. In a motor-control system, the combination with a motor and a source of current supply, of a controlling circuit, an impedance coil in the circuit, a magnetic core movable in said coil to vary the inductance of the circuit, a dashpot connected to the core to retard its movement in one direction, a controlling lever, a coil spring connection between the lever and core, to permit a rapid movement of the lever followed by the retarded movement of the core, and means responsive to the variation of inductance in the circuit to control the speed of the motor.

9. In a motor-control system, the combination with a motor and a source of current supply, of a controlling circuit, spaced contacts in the circuit, an impedance coil in the circuit, a movable member having a magnetic core connected thereto at one end and movable with respect to the coil to vary the impedance of the circuit, a dashpot connected to the other end of the movable member, a manually-operable controlling lever, a yielding connection between the lever and said member, a contact carried by the lever and movable into position to bridge the spaced contacts upon the initial movement of the lever, and maintain a sliding connection during the remaining movement of the lever, yielding means for returning the lever to its initial position, and means responsive to variation in the impedance of the circuit for controlling the speed of the motor.

10. In a motor-control system, the combination with a motor and a source of current supply, of a controlling circuit, manually-operable means for varying the inductance of said circuit, automatic means for limiting the speed with which the inductance is decreased, and means operable upon such decrease in the inductance to increase the speed of the motor.

11. In a motor-control system, the combination with a motor and a source of current supply, of a starting resistance, a controlling circuit, relays in said circuit for controlling the circuits through the starting resistance, an impedance coil in the controlling circuit, a manually-operable controlling lever, means associated with said lever for decreasing the impedance of said coil when the lever is moved in one direction, and increasing the impedance when the lever is moved in the opposite direction, and means for automatically retarding the speed with which the impedance is decreased when the lever is moved rapidly in a direction to produce such decrease in speed, said retarding means being inoperative when the lever is moved in the opposite direction.

12. In a motor-control system, the combination with a motor and a source of alternating current supply, of a sectional starting resistance, a controlling circuit, controlling magnets in said circuit operative successively as the current increases to cut out the starting resistance, an impedance coil in the controlling circuit normally preventing sufficient flow of current to operate the controlling magnets, a magnetic core in said coil, a manually operable lever, a yielding connection between the lever and core for moving the core to gradually reduce the impedance of the coil and permit the successive operation of the controlling magnets, and means for automatically retarding the movement of the core when the controlling lever is moved rapidly.

13. In a motor-control system, the combination with a source of current supply, a motor having a normally open field circuit, and a starting resistance, of a manually-operable controlling lever, means operated during the first part of the movement of said lever for closing the field circuit, a controlling circuit, controlling magnets in said circuit operative successively to control the starting resistance, and means associated with the lever for gradually reducing the impedance of the controlling circuit after the field circuit is closed.

14. In a motor-control system, the combination with a source of current supply, a motor having a normally open field circuit, and a starting resistance, of a controlling circuit, a manually-operable lever, means operated during the first part of the movement of said lever for closing the field circuit, means associated with said lever for varying the impedance of the controlling circuit upon a continued movement of the lever after the field circuit is closed, and means responsive to said variation for controlling the starting resistance.

In testimony whereof, I have signed my name to this specification in the presence of two subscribing witnesses.

AUGUST SUNDH.

Witnesses:
  CHAS. M. NISSEN,
  NORMAN VEITCH.